(No Model.)

J. HARTMANN.
HOOP SAWING MACHINE.

No. 314,835. Patented Mar. 31, 1885.

WITNESSES

Joseph Hartmann
INVENTOR

By
Attorneys

N. PETERS, Photo-Lithographer, Washington, D. C.

UNITED STATES PATENT OFFICE.

JOSEPH HARTMANN, OF FREMONT, OHIO, ASSIGNOR TO JACOB HENRY ORWIG, OF SAME PLACE.

HOOP-SAWING MACHINE.

SPECIFICATION forming part of Letters Patent No. 314,835, dated March 31, 1885.

Application filed December 30, 1884. (No model.)

*To all whom it may concern:*

Be it known that I, JOSEPH HARTMANN, a citizen of the United States, residing at Fremont, in the county of Sandusky and State of Ohio, have invented a new and useful Improvement in Hoop-Sawing Machines, of which the following is a specification, reference being had to the accompanying drawings.

My invention relates to hoop-sawing machines, and it has for its object to provide improved means for regulating the thickness of the hoop to be cut.

A further object of the invention is to provide a hoop-sawing machine with saws, one of which is vertically adjustable, whereby different thicknesses of stock may be accommodated.

A further object of the invention is to improve the details of construction of hoop-sawing machines, and to provide a machine of this character which shall be simple in its construction, effective in its operation, and strong and durable.

The invention consists in the combination, with a suitable frame or table, of a saw or saws and rollers located in front of said saw or saws, one of said rollers being adapted to be moved laterally.

The invention further consists in the improved construction and combinations of parts hereinafter fully described, and pointed out in the claims.

Figure 1:
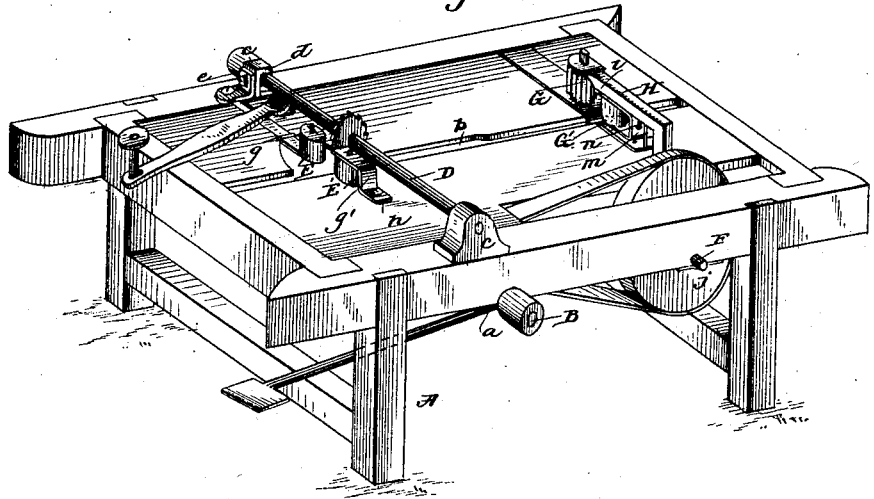
Figure 2:
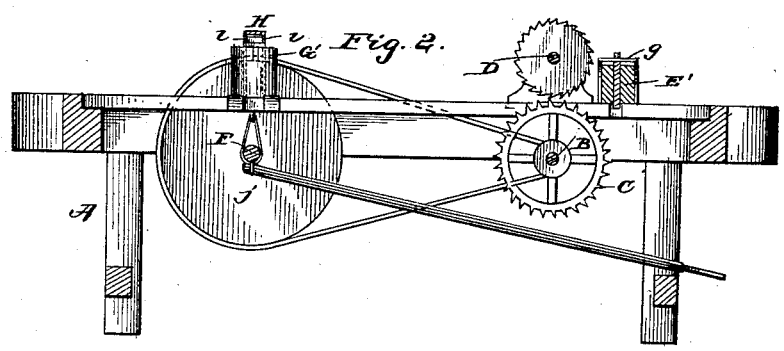
Figure 4:
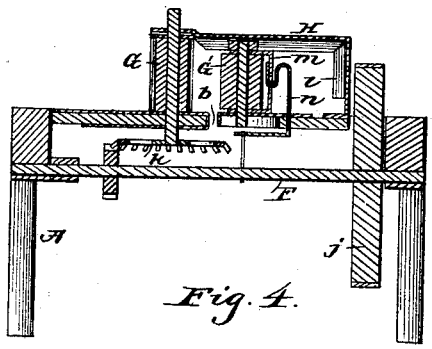
Figure 3:
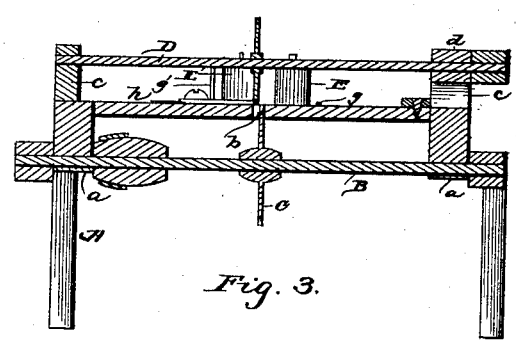

In the drawings, Figure 1 is a perspective view of a hoop-sawing machine constructed in accordance with my invention. Fig. 2 is a longitudinal vertical section of the same. Fig. 3 is a transverse vertical section, and Fig. 4 is another transverse section taken through the rollers, which serve as a guide for the stock to the saws, and which regulate the thickness of the hoop to be cut.

In the accompanying drawings, in which like letters of reference indicate corresponding parts in all the figures, A represents the supporting frame or table, upon the under side of which, near the forward end thereof, is mounted in brackets *a* a power-shaft, B, carrying a rigid circular saw, C, midway between its ends, said saw projecting or extending into a slot, *b*, formed in the table.

Upon the upper side of the table or frame, in a vertical line with the power-shaft B, is mounted a shaft, D, carrying a rigidly-mounted saw midway between its ends, said saw having its edge or teeth fitting in the slot of the table before mentioned. The said shafts are connected at one end by means of a belt or band, whereby motion is transmitted from the power-shaft B to the shaft D, thus revolving the saws in the same direction. The ends of the shaft D are mounted in bearings formed in brackets *c*, said brackets having the extension-plates *d*, provided with elongated slots. The said brackets are attached by means of the slotted plates to posts or uprights *e*, carrying set-screws. It will thus be seen that by loosening the set-screws the shaft D and its saw may be raised or lowered and secured at the desired adjustment, to be determined by the thickness of the stock to be operated upon.

E E' represent guide-rollers arranged upon the upper side of the frame or table just forward of the saws, the stock or strip from which the hoops are to be cut being adapted to be passed through said rollers. The roller E has attached to its under side a bar or plate which is fitted in a groove or slot formed upon the top of the frame or table, said plate or bar being held against vertical displacement by a keeper, *g*. The end of said rod or bar is attached to an arm or lever, which is pivoted in rear of the said plate or bar at right angles to the rear end of the same. It will thus be seen that by moving said arm or lever the roller E may be moved to or from the saw or saws. The roller E' is mounted in a bracket, *g'*, the end of which has an extension, *h*, formed with a slot. A set-screw works in said slot and in a slot in the table, thus allowing said bracket and its roller to be adjusted laterally and held firmly in place. At the rear end of the top or table, upon the under side thereof, is mounted a shaft, F, having band-wheel *j*, which is connected with a pulley-wheel on the power-shaft by means of a belt or band.

Located directly above the shaft F, to one side of a line drawn longitudinally through the center of the table, is a vertically-disposed fluted or grooved roller, G, the shaft of which extends through the top of the table or frame, and has mounted thereon a crown-wheel, $k$, which meshes with a spur-wheel on the shaft F. The upper end of said fluted or grooved roller is mounted in the end of an angular arm, H, secured to the top of the table or frame, and said arm is provided with downwardly-extending side flanges, $l$.

G' represents a roller located on the same plane with the fluted roller, the lower end of said roller G' bearing in an elongated slot in the top of the table or frame, and its upper end being located between the flanges $l$ o the angular arm H, said roller carrying a bracket, $m$, to which is attached a bent rod or arm, $n$, extending through a hole or opening in the top of the frame, said lower end of the rod or arm $n$ being bent at right angles to the body portion. Attached to the bent end of the said rod or arm is a cord which passes through a pulley upon the under side of the top, and attached to the said cord is a foot-lever, by depressing which the roller G' is held in place.

The operation may be briefly described as follows: The stock is fed to the saws, and is held in place by the rollers in front of the same and guided in a straight line thereto. The hoop as it is cut passes off to one side of the machine, while the stock passes between the fluted wheel and the roller adjacent thereto, said fluted wheel serving to draw the stock forward and hold it in place.

As before mentioned, the saw which is arranged upon top of the frame may be vertically adjusted to the thickness of the stock to be operated upon, and the guide-rollers in front of the saws may be adjusted to the thickness of the hoop to be cut.

The before-described sawing-machine is simple in its construction, may be manufactured and supplied at a slight cost, is effective in its operation, and the several adjustments mentioned may be readily had.

Having fully described my invention, what I claim as new, and desire to secure by Letters Patent, is—

1. In a hoop-sawing machine, the combination, with a table or frame, of a bracket, $c$, having a hole or opening, the plate $d$, having an elongated slot, said plate and bracket being adjustably connected, a shaft mounted in said bracket at one end, a shaft, a saw on said shaft, and guide-rollers located in front of the saw, one of said rollers having a laterally-movable bearing, substantially as set forth.

2. In a hoop-sawing machine, the combination, with a shaft mounted upon the under side of the top of the frame or table, and having a spur-wheel, of a shaft having a crown-wheel to gear therewith, a fluted roller upon said shaft, an angular bracket having side flanges, said bracket receiving the upper end of said shaft, a roller or idler mounted in a bracket, the shaft of said idler bearing in a slot in the table at its lower end, its upper end fitting between the flanges $l$, and means for holding said roller against lateral movement, substantially as set forth.

In testimony that I claim the foregoing as my own I have hereto affixed my signature in presence of two witnesses.

JOSEPH HARTMANN.

Witnesses:
E. F. DICKINSON,
C. DONEYSON.